No. 815,260. PATENTED MAR. 13, 1906.
G. A. BRONDER.
LUBRICATING DEVICE.
APPLICATION FILED AUG. 14, 1902.
2 SHEETS—SHEET 1.
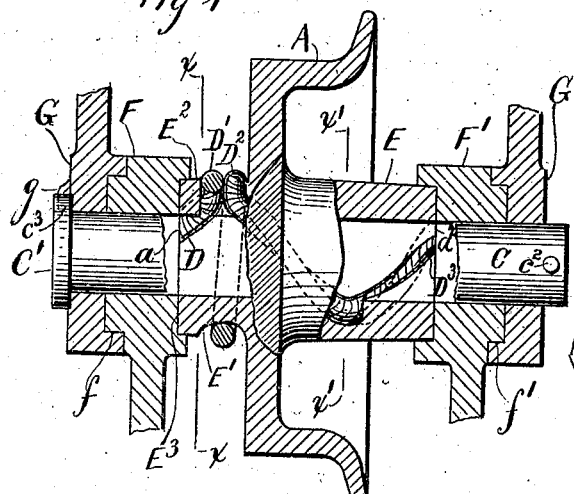
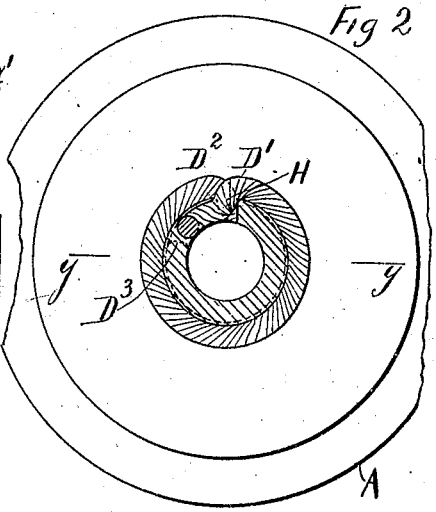
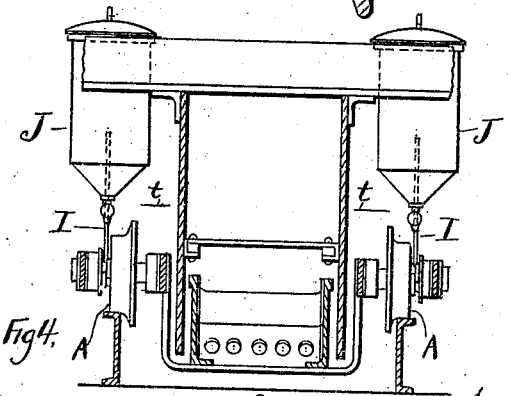
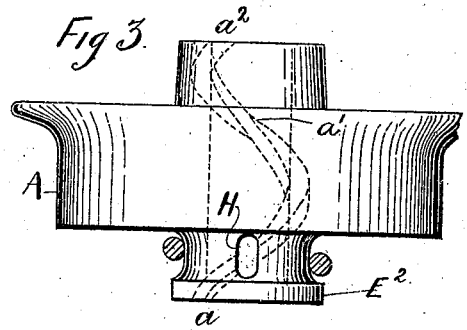
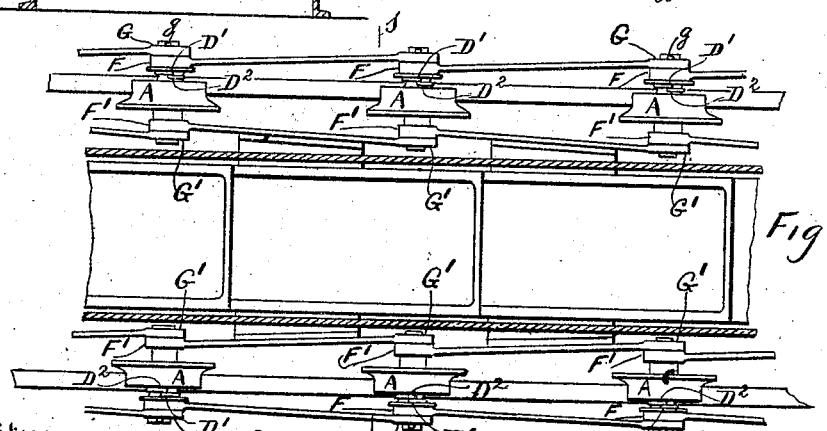
Witnesses
Frederic H. Carl
Ia Greenaway
Inventor
Gaston A. Bronder
By his Attorney
A. N. de Bonneville No. 815,260. PATENTED MAR. 13, 1906.
G. A. BRONDER.
LUBRICATING DEVICE.
APPLICATION FILED AUG. 14, 1902.
2 SHEETS—SHEET 2.
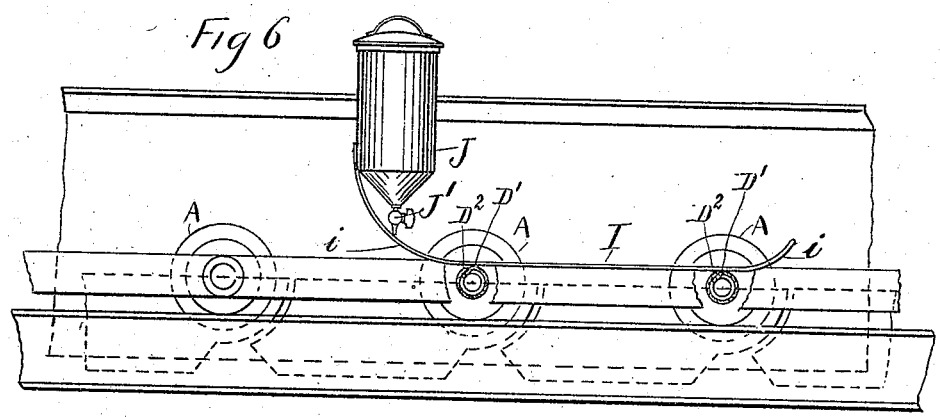
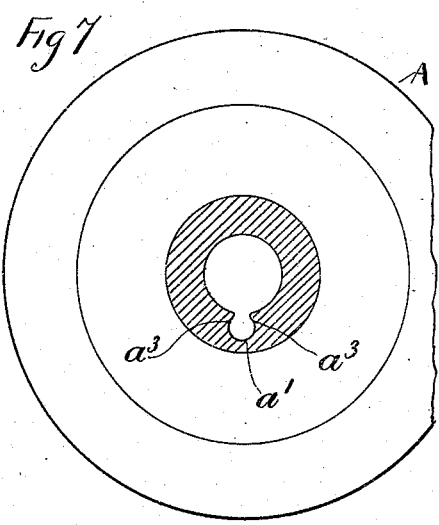 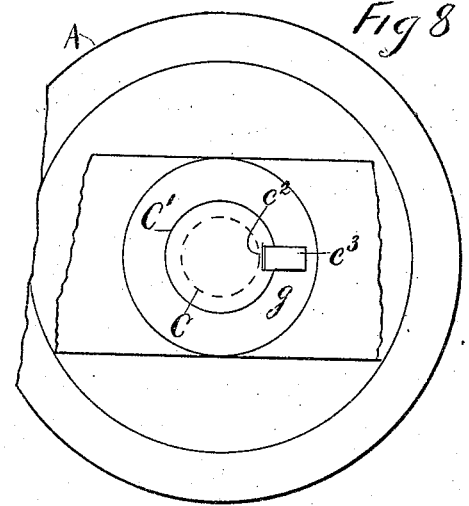
Witnesses
Frederic H. Carl.
Ins Greenaway
Inventor
Gaston A. Bronder
By his Attorney
A de Bonneville

UNITED STATES PATENT OFFICE.

GASTON A. BRONDER, OF BROOKLYN, NEW YORK.

LUBRICATING DEVICE.

No. 815,260.　　　　Specification of Letters Patent.　　Patented March 13, 1906.

Application filed August 14, 1902. Serial No. 119,629.

*To all whom it may concern:*

Be it known that I, GASTON A. BRONDER, a citizen of the United States, and a resident of the borough of Brooklyn, in the county of Kings and State of New York, have invented certain new and useful Improvements in Lubricating Devices for Wheels and Axles, of which the following is a specification.

This invention relates to the lubrication of wheels turning on axles; and its object is the production of means by which the bearing-surfaces of the wheels and their axles can be easily lubricated over their whole area, as well as the end faces of the hubs of the said wheels.

In the accompanying drawings and specification I have shown my invention applied to the wheels of my conveyer described in my patent application filed March 22, 1902, Serial No. 99,422, and it is evident that my invention can be applied to wheels turning on axles of various apparatus.

Figure 1 represents an axial longitudinal vertical section of my invention with a partial section on the same plane of the links of the conveyer attached to the axle of the wheel. Fig. 2 shows a section of Fig. 1 on the line $x\,x$. Fig. 3 is a top view of my wheel with a section of the wick around the hub of the wheel on the line $y\,y$ of Fig. 2. Fig. 4 represents a section of a conveyer with my invention as on the line $s\,s$ of Fig. 5. Fig. 5 shows a section of Fig. 4 on the line $t\,t$. Fig. 6 represents a side view of Fig. 4 with a portion of a couple of links broken away. Fig. 7 is a section of Fig. 1 on the line $x'\,x'$. Fig. 8 shows a partial end view of the wheel and the links of a conveyer.

The wheel is represented at A and contains the curved and preferably helical groove $a\,a'\,a^2$, formed in the cylindrical bearing-surface of its hub E E', constituting with the axle C an inclosure for the wick D D' D² D³. The hub E E' extends from the wheel, and on the end E' of the said hub there is generally formed a collar E² outside of and beyond the body of the wheel, by means of which an annular space is formed outside of the body of the wheel for wrapping the said wick, and an opening H extends from the said annular space to the said groove. On the end face E³ of the collar E² there abuts in the application of the invention shown in the drawings the link with the boss F of a conveyer, the said link also being supported on the circumferential surface of the said collar, by which disposition dust is prevented reaching the bearing-surface of the link on the axle or the wheel on the said axle. The end E of the hub E E' is sufficiently extended to support the boss F' of the accompanying link of the said conveyer, the latter link bearing against the end of the hub of the wheel adjacent thereto, and by this means dust is also prevented reaching the bearing-surface of the link on the axle or the surface between the wheel and axle. The bosses F and F' of the links are respectively formed with shoulders $f\,f'$ to suit counterbores in the bosses G G' of the links, which constitute additional means to prevent dust reaching the axle. A lug $g$ is generally cast on the bosses G of the links and fits in a slot $c^3$, formed in the collar C' of the axle C, to prevent the latter turning, the said axle being also provided with a pin through a hole $c^2$ to hold parts of the apparatus together.

The bosses F F' of the links are each wider than the bosses G G', and the flexibility of the chain of links is thereby obtained on large wearing-surfaces, and the axles being held by the lugs $c^3$ on the bosses G of the links prevent the said axles turning on the outside narrow bosses G G' of the links, each link having at one end a wide boss and a narrow boss at the other end.

The whole portion of the bearing-surface between the wheel and axle can be lubricated either by means of the wick D D' D² D³ or the wick can be dispensed with and the lubricant directly applied by means of the said groove.

The helical form of the groove prevents the same cutting the axle and secures a uniform bearing-surface over the whole length thereof.

My preferred form of groove, as shown in Fig. 7, contains converging longitudinal sides $a^3$, that incline toward each other at the junction of the axle and the bearing-surface of the wheel, thereby forming a dovetailed inclosure for the wick, which prevents the same being dislodged when the axle is removed from its wheel. The groove is preferably made to encircle the bearing-surface its entire length, the ends of the groove extending to the side faces of the bosses of the links, and thereby obtaining easy means of lubricating between the ends of the hubs of the wheels and the said side faces of the bosses of the links.

The wick is generally secured in the groove by running it therein from D to D', passing through the opening H, next wrapping around the annular space on the hub E', and then again returning through the opening H, entering the groove at $D^2$ and terminating at $D^3$. The wick is thus wrapped around the hub of the wheel, and the whole wrap thereof can be used to apply a lubricant, either with a wiper or other means, which disposition allows the lubricant to be applied to the wick irrespective of the angular position of the opening H in the hub leading to the groove in the wheel.

To apply the lubricant to the wick or opening H in case no wick is used, (see Figs. 4 and 6,) I employ wipers consisting generally of rods I, extending from the reservoirs J and located to bear on the wicks or annular grooves on the hubs of the wheels, as shown at $D'$ $D^2$. The wipers are generally made long enough to extend over two wheels and are curved up at their ends $i$, so that the conveyer can run under them in either direction and good contact be secured between the wiper and the wick or wheel. The lubricant issues from the reservoir through an opening or cock J' and from thence runs down the wiper and is led to the wick.

Having described my invention, I claim—

1. The combination of an axle, a wheel thereon, a wick wrapped around the hub of the wheel, a wiper curved up at its ends arranged to bear on the said wick, and a reservoir for a lubricant connected with the wiper.

2. The combination of an axle, a wheel on the axle having an opening in the hub thereof and extending to the axle, a wiper curved up at its ends bearing on the hub of the wheel over said opening, so as to allow the wheel to pass under the same in one direction and in the reverse direction, and a reservoir arranged to feed a lubricant to the wiper.

3. The combination of axles, hubs of wheels on the axles having grooves in their bearing-surfaces and each having an opening in the said hubs connecting with the grooves, wicks extending through the grooves and through the said opening and also wrapped around the hub, a wiper curved up at its ends arranged to bear on both the wicks wrapped around the hubs, the curved ends of the wiper allowing the wheels to run under the same in one direction and in the reverse direction thereof, and means to feed a lubricant to the wiper.

Signed at New York, in the county of New York and State of New York, this 7th day of August, A. D. 1902.

GASTON A. BRONDER.

Witnesses:
FREDERIC H. CARL,
JAS. GREENAWAY.